(12) United States Patent
Lee et al.

(10) Patent No.: US 8,422,385 B2
(45) Date of Patent: *Apr. 16, 2013

(54) CONTROL METHOD FOR UPLINK CONNECTING OF IDLE TERMINAL

(75) Inventors: Young Dae Lee, Anyang-Si (KR); Seung June Yi, Anyang-Si (KR); Sung Jun Park, Anyang-Si (KR); Sung Duck Chun, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 319 days.

This patent is subject to a terminal disclaimer.

(21) Appl. No.: 12/671,020

(22) PCT Filed: Aug. 11, 2008

(86) PCT No.: PCT/KR2008/004666
§ 371 (c)(1),
(2), (4) Date: Jan. 27, 2010

(87) PCT Pub. No.: WO2009/022837
PCT Pub. Date: Feb. 19, 2009

(65) Prior Publication Data
US 2010/0195522 A1    Aug. 5, 2010

Related U.S. Application Data

(60) Provisional application No. 60/955,040, filed on Aug. 10, 2007, provisional application No. 60/955,651, filed on Aug. 14, 2007.

(30) Foreign Application Priority Data

Aug. 11, 2008 (KR) .................. 10-2008-0078476

(51) Int. Cl.
*H04L 12/26* (2006.01)

(52) U.S. Cl.
USPC ................. 370/252; 370/312; 370/329

(58) Field of Classification Search ............... 370/252, 370/312, 329, 448, 310, 328, 390; 455/412.1, 455/418, 452.2, 450
See application file for complete search history.

(56) References Cited

U.S. PATENT DOCUMENTS

| 5,878,041 A | 3/1999 | Yamanaka et al. |
| 6,445,917 B1 | 9/2002 | Bark et al. |

(Continued)

FOREIGN PATENT DOCUMENTS

| CN | 161321 A | 5/2005 |
| CN | 1761356 A | 4/2006 |

(Continued)

OTHER PUBLICATIONS

Ghosh et al, Random Access Design for UMTS Air-Interface Evolution, Apr. 2007, IEEE.*

(Continued)

*Primary Examiner* — Michael Thier
*Assistant Examiner* — Vincelas Louis
(74) *Attorney, Agent, or Firm* — Birch, Stewart, Kolasch & Birch, LLP

(57) ABSTRACT

A method for controlling an uplink connection of an idle UE in a wireless communication system is disclosed. In a method for performing a random access procedure by an idle-mode user equipment (UE) which desires to receive a specific broadcast/multicast service in a wireless communication system, the method includes, receiving a first message transmitted from a network, so as to count the number of UEs which desire to receive the broadcast/multicast service, transmitting a preamble for a random access to the network, receiving a second message including uplink (UL) radio resource allocation information from the network in response to the preamble, transmitting a third message selected according to a connection indication information contained in the first or second message to the network using the uplink (UL) radio resource allocation information, wherein the connection indication information indicates whether a connection to the network is required or not, and receiving a contention resolution message from the network.

20 Claims, 6 Drawing Sheets

U.S. PATENT DOCUMENTS

| | | |
|---|---|---|
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,809,632 B2 | 10/2004 | Kim et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 * | 7/2008 | Choi et al. ............ 370/310 |
| 7,464,166 B2 | 12/2008 | Larsson et al. |
| 7,471,943 B2 | 12/2008 | Chun et al. |
| 7,710,930 B2 | 5/2010 | Kwak |
| 7,817,595 B2 | 10/2010 | Wu |
| 7,876,771 B2 * | 1/2011 | Bergstrom et al. ........ 370/448 |
| 7,957,755 B2 | 6/2011 | Ishii et al. |
| 7,978,616 B2 | 7/2011 | Chun et al. |
| 8,027,363 B2 | 9/2011 | Chun et al. |
| 8,059,597 B2 | 11/2011 | Park et al. |
| 8,081,662 B2 | 12/2011 | Chun et al. |
| 8,130,687 B2 * | 3/2012 | Cai et al. ............ 370/312 |
| 2002/0001314 A1 | 1/2002 | Yi et al. |
| 2002/0009999 A1 | 1/2002 | Lee et al. |
| 2002/0122411 A1 | 9/2002 | Zimmerman et al. |
| 2003/0007490 A1 | 1/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0146067 A1 | 7/2004 | Yi et al. |
| 2004/0147236 A1 | 7/2004 | Parkvall et al. |
| 2004/0151154 A1 | 8/2004 | Wu |
| 2004/0156330 A1 | 8/2004 | Yi et al. |
| 2004/0162065 A1 | 8/2004 | Chun et al. |
| 2004/0184438 A1 | 9/2004 | Terry |
| 2004/0229626 A1 * | 11/2004 | Yi et al. ............ 455/450 |
| 2005/0020260 A1 | 1/2005 | Jeong et al. |
| 2005/0026597 A1 * | 2/2005 | Kim et al. ............ 455/412.1 |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0094596 A1 | 5/2005 | Pietraski et al. |
| 2005/0096017 A1 | 5/2005 | Kim |
| 2005/0105499 A1 | 5/2005 | Shinozaki et al. |
| 2005/0118992 A1 | 6/2005 | Jeong et al. |
| 2005/0164683 A1 | 7/2005 | Roberts et al. |
| 2005/0192021 A1 * | 9/2005 | Lee et al. ............ 455/452.2 |
| 2005/0201354 A1 | 9/2005 | Hosaka et al. |
| 2005/0207343 A1 | 9/2005 | Han |
| 2005/0233732 A1 | 10/2005 | Kwak et al. |
| 2005/0237932 A1 | 10/2005 | Liu |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067289 A1 | 3/2006 | Lee |
| 2006/0067361 A1 | 3/2006 | Lee et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0280145 A1 | 12/2006 | Revel et al. |
| 2006/0281456 A1 | 12/2006 | Roberts et al. |
| 2007/0047493 A1 | 3/2007 | Park et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0104141 A1 | 5/2007 | Park et al. |
| 2007/0178878 A1 | 8/2007 | Ding |
| 2007/0183358 A1 * | 8/2007 | Cai ............ 370/328 |
| 2007/0189205 A1 | 8/2007 | Terry et al. |
| 2007/0201397 A1 | 8/2007 | Zhang |
| 2007/0268861 A1 | 11/2007 | Diachina et al. |
| 2007/0274278 A1 | 11/2007 | Choi et al. |
| 2007/0297367 A1 | 12/2007 | Wang et al. |
| 2008/0043658 A1 * | 2/2008 | Worrall ............ 370/312 |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0084871 A1 | 4/2008 | Wang et al. |
| 2008/0165717 A1 * | 7/2008 | Chen et al. ............ 370/312 |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0233941 A1 * | 9/2008 | Jen ............ 455/418 |
| 2008/0261581 A1 | 10/2008 | Cai |
| 2008/0268878 A1 | 10/2008 | Wang et al. |
| 2008/0273482 A1 * | 11/2008 | Lee et al. ............ 370/312 |
| 2008/0273610 A1 * | 11/2008 | Malladi et al. ............ 375/260 |
| 2008/0318578 A1 | 12/2008 | Worrall |
| 2009/0016301 A1 | 1/2009 | Sammour et al. |
| 2009/0104890 A1 | 4/2009 | Wang et al. |
| 2009/0175163 A1 | 7/2009 | Sammour et al. |
| 2009/0305712 A1 | 12/2009 | Franceschini et al. |
| 2010/0128648 A1 * | 5/2010 | Lee et al. ............ 370/312 |
| 2010/0232335 A1 * | 9/2010 | Lee et al. ............ 370/312 |
| 2011/0019604 A1 * | 1/2011 | Chun et al. ............ 370/312 |

FOREIGN PATENT DOCUMENTS

| | | |
|---|---|---|
| EP | 1326397 A2 | 7/2003 |
| EP | 1343267 A2 | 9/2003 |
| EP | 1508992 A2 | 2/2005 |
| EP | 1689130 A1 | 8/2006 |
| EP | 1746855 A2 | 1/2007 |
| EP | 1768297 A2 | 3/2007 |
| EP | 0 179 405 A1 | 6/2007 |
| JP | 7-162948 A | 6/1995 |
| JP | 2001-197021 A | 7/2001 |
| JP | 2003-018050 A | 1/2003 |
| JP | 2003-115796 A | 4/2003 |
| JP | 2003-283592 A | 10/2003 |
| JP | 2006-054718 A | 2/2006 |
| JP | 2006-514466 A | 4/2006 |
| JP | 2007-116639 A | 5/2007 |
| KR | 10-2001-0045783 A | 6/2001 |
| KR | 10-2001-0062306 A | 7/2001 |
| KR | 10-2002-0004645 A | 1/2002 |
| KR | 10-2003-0012048 A | 2/2002 |
| KR | 10-2002-0097304 A | 12/2002 |
| KR | 10-2003-0060055 A | 7/2003 |
| KR | 10-2003-0068743 A | 8/2003 |
| KR | 1020030087914 A | 11/2003 |
| KR | 10-2004-0034398 A | 4/2004 |
| KR | 10-2004-0039944 A | 5/2004 |
| KR | 10-2004-0072961 A | 8/2004 |
| KR | 10-2005-0022988 A | 3/2005 |

| | | |
|---|---|---|
| KR | 10-2005-0062359 A | 6/2005 |
| KR | 10-2005-0081836 A | 8/2005 |
| KR | 10-2005-0092874 A | 9/2005 |
| KR | 10-2005-0099472 A | 10/2005 |
| KR | 10-2005-0100882 A | 10/2005 |
| KR | 10-2005-0103127 A | 10/2005 |
| KR | 10-2006-0004935 A | 1/2006 |
| KR | 10-2006-0014910 A | 2/2006 |
| KR | 10-2006-0042858 A | 5/2006 |
| KR | 10-2006-0069378 A | 6/2006 |
| KR | 10-2006-0079784 A | 7/2006 |
| KR | 10-2006-0090191 A | 8/2006 |
| KR | 10/0617162 B1 | 8/2006 |
| KR | 10-2006-00134058 A | 4/2007 |
| KR | 10-2007-0048552 A | 5/2007 |
| RU | 2304348 C2 | 8/2007 |
| WO | WO-03/045103 A1 | 5/2003 |
| WO | WO 2004/017541 A1 | 2/2004 |
| WO | WO-2004/042963 A1 | 5/2004 |
| WO | WO-2005/039108 A2 | 4/2005 |
| WO | WO 2005/079105 A1 | 8/2005 |
| WO | WO-2005/125226 A2 | 12/2005 |
| WO | WO 2006/016785 A1 | 2/2006 |
| WO | WO 2006/033521 A1 | 3/2006 |
| WO | WO-2006/046894 A1 | 5/2006 |
| WO | WO-2006/052086 A | 5/2006 |
| WO | WO 2006/083149 A1 | 8/2006 |
| WO | WO-2006/118418 A2 | 9/2006 |
| WO | WO 2006/104335 A2 | 10/2006 |
| WO | WO 2006/104342 A2 | 10/2006 |
| WO | WO 2006/116620 A2 | 11/2006 |
| WO | WO-2007/024065 A1 | 3/2007 |
| WO | WO-2007/039023 A1 | 4/2007 |
| WO | WO-2007/052900 A1 | 5/2007 |
| WO | WO-2007/066900 A1 | 6/2007 |
| WO | WO-2007/078142 A1 | 7/2007 |
| WO | WO 2007/078155 A2 | 7/2007 |
| WO | WO-2007/078164 A1 | 7/2007 |
| WO | WO-2007/078173 A1 | 7/2007 |
| WO | WO-2007/078174 A | 7/2007 |
| WO | WO 2007/078174 A1 | 7/2007 |
| WO | WO-2007/078174 A1 | 7/2007 |
| WO | WO-2007/089797 A2 | 8/2007 |
| WO | WO-2007/126793 A2 | 11/2007 |
| WO | WO-2007/147431 A | 12/2007 |

OTHER PUBLICATIONS

Catt, "Consideration on UL Buffer Reporting", 3GPP TSG-RAN WG2 #55, R2-062934, Oct. 9, 2006 pp. 103 XP002513924, Retrieved from Internet: URL:http://www.3gpp.org/ftp/tsg_ran/WG2_RL2/TSGR2_55/Documents/>.

NEC: "Optimised Buffer Status Reporting" 3GPP TSG-RAN WG2#58BIS Meeting, Orlando, Fla., Jun. 25-29, 2007, vol. R2-072515, Jun. 20, 2007, pp. 1-6, XP002503220, Retrieved from Internet: URL:www.3gpp.org>.

XP002503218; Nokia: "Buffer reporting for E-UTRAN", R2-060829, pp. 1-5, Mar. 1, 2006.

XP008125208; Nokia: "Uplink Scheduling for Voip", R2-070476, Feb. 12, 2007, pp. 1-15.

Wang et al., U.S. Appl. No. 60/976,139.

Sammour et al., U.S. Appl. No. 61/019,058.

Cohen, "An Improved SSCOP-like Scheme for Avoiding Unnecessary Retransmissions and Achieving Ideal Throughput", Institute of Electrical and Electronics Engineers, vol. 24, XP010158150, Mar. 24, 1996, pp. 855-862.

Zte, "Redundant retransmission restraint in RLC-AM," 3GPP TSG-RAN WG2 Meeting #53, R2-061234, May 8-12, 2006, Shanghai, China, pp. 1-5, XP050131180.

Esti, "Digital Cellular Telecommunications System (Phase 2+); Functional stage 2 description of Location Services (LCS) in Geran (3GPP TS 43.059 version 7.3.0 Release 7)," ETSI TS 143 059 V7.3.0, May 2007 (71 pages).

Office Action for U.S. Appl. No. 12/733,179 dated Nov. 16, 2010.

XP050104502; Ericsson: "Scheduling Request in E-UTRAN" 3GPP Draft; R1-070471, Jan. 10, 2007.

XP050105413; Texas Instruments: "UL Synchronization Management in LTE_ACTIVE", R1-071478, Mar. 21, 2007.

XP050105936; Texas Instruments: "UL Synchronization Management and Maintenance in E-UTRA", 3GPP Draft; R1-072198, May 1, 2007.

XP050130928; LG Electronics Inc: "UE State Transition in LTE_Active", 3GPP Draft; R2-061002, Mar. 23, 2006.

XP050133763; Motorola: "Contention-free Intra-LTE Handover" 3GPP Draft; R2-070730, Feb. 9, 2007.

ASUSTeK, "On-Line Recovery of HFN Synchronization Due to RLC UM SN Problem," 3GPP TS 25.322 v5.7.0 (Dec. 2003), 3GPP TSG-RAN WG2 Meeting #44, R2-041940, Sophia-Antipolis, France, Oct. 4-8, 2004, 4 pages.

Rapporteur (ASUSTeK), "Summary of HFN De-Synchronization Problem Off-Line Email Discussion," 3GPP TSG RAN WG2 #46, Tdoc R2-050318, Scottsdale, Arizona, USA, Feb. 14-18, 2005, 4 pages.

U.S. Appl. No. 60/944,662, filed Jun. 18, 2007, cited in Office Action for U.S. Appl. No. 12/475,107, dated Jun. 24, 2010.

U.S. Appl. No. 61/006,348, filed Jan. 8, 2008, cited in Office Action for U.S. Appl. No. 12/475,107, dated Jun. 24, 2010.

Office Action for U.S. Appl. No. 12/475,107, dated Jun. 24, 2010.

Ghosh et al., "Random Access Design for UMTS Air-Interface Evolution", Vehicular Technology Conference, 2007, VTC2007-Spring, IEEE 65th; Apr. 22-25, 2007, pp. 1041-1045.

Nokia, "System Information Distribution", 3GPP TSG-RAN WG2 Ad Hoc Meeting on LTE, R2-061487, Cannes, France, Jun. 27-30, 2006, pp. 1-3.

Abeta et al., "Super 3G Technology Trends, Part 2: Research on Super 3G Technology", NTT DoCoMo Technical Journal, vol. 8, No. 3, Dec. 2006, pp. 55-62.

LG Electronics, "Delivery of LTE System Information", 3GPP TSG-RAN WG2 Ad Hoc on LTE, R2-061959, Cannes, France, Jun. 2006, pp. 1-4.

Catt, "Notification scheme for system information Change," 3GPP TSG-RAN WG2#58, R2-071870, Kobe, Japan, May 7-11, 2007, pp. 1-5.

LG Electronics Inc, "Discussion on BCCH Update," 3GPP TSG-RAN WG2 #58bis, R2-072736, Orlando, USA, Jun. 25-29, 2007, 3 pages.

* cited by examiner

СCONTROL METHOD FOR UPLINK CONNECTING OF IDLE TERMINAL

This Non-provisional application claims priority under 35 U.S.C. §119(e) on U.S. Provisional Application No(s). 60/955,040 filed on Aug. 10, 2007, and 60/955,651 filed on Aug. 14, 2007, and under 35 U.S.C. 119(a) to patent application No. 10-2008-0078476 filed on Aug. 11, 2008 all of which are hereby expressly incorporated by reference into the present application.

TECHNICAL FIELD

The present invention relates to a wireless communication system, and more particularly to a method for controlling an uplink connection of a terminal in idle mode.

BACKGROUND ART

An Evolved Universal Mobile Telecommunications System (E-UMTS) based on an asynchronous mobile communication system standard (3GPP) transmits and provides a variety of data and services. For example, there are system information via a BCH (broadcast channel), control message via a PDCCH (physical downlink control channel), user traffic or control message via a downlink SCH (shared channel) or an uplink SCH (shared traffic or control message of broadcast/multicast service (MBMS) via a downlink SCH or a downlink MCH (multicast channel), initial uplink control message via a RACH (random access channel) and the like.

The MBMS (multimedia broadcast multicast service) is a sort of a broadcast/multicast service and is the service that simultaneously transmits data packets to a service that simultaneously transmits data packets to a plurality of user equipments (UEs). In this disclosure, 'broadcast/multicast service' can be replaced by one of different terminologies including 'MBMS', 'point-to-multipoint service', 'MBS (multicast and broadcast service' and the like. In the MBMS based on IP multicast, UEs share resources required for data packet transmission and receive the same multimedia data. Hence, in case that a UE at a predetermined level, which uses MBMS, exists in the same cell, it is able to raise resource efficiency. As the MBMS has nothing to do with an RRC connection, a UE in an idle mode can be provided with the service.

There are two kinds of MBMS operation modes, i.e., a broadcast mode and a multicast mode. The broadcast mode allows a single transmitter to transmit data to all receivers in the same sub-network. The multicast mode allows one or more transmitters to transmit data to one or more specific receivers. In the multicast mode, an intention to receive data needs to be delivered to a network and subscription and leaving is available.

In order to efficiently manage the broadcast/multicast service, it is necessary to check the number of UEs that attempt to receive a specific service. This kind of information is usable in determining an optimal scheme for providing the broadcast/multicast service. For instance, if the small number of UEs are interested in the corresponding service, it may be more efficient to use a separate dedicated channel to provide the service to each of the UEs. On the contrary, if a plurality of UEs are interested in the corresponding service, it may be more efficient to use a common channel.

A method for counting a UE which desires to receive a specific broadcast/multicast service (hereinafter referred to as 'MBMS counting') is initiated when an access information message is transmitted to the UE via a MCCH. If the UE attempting to receive the service is in an RRC connected state, counting can proceed using a dedicated channel or a RACH. On the other hand, if a UE is in an idle mode, an RRC connection request message is transmitted in accordance with a random access procedure using a RACH.

In the following description, the RACH and a random access procedure in WCDMA system are explained. First of all, a RACH is used to transmit data of a short length in uplink. And, such an RRC message as an RRC connection request message, a cell update message, a URA update message and the like is transmitted via the RACH. A logical channel such as CCCH (common control channel), DCCH (dedicated control channel) and DTCH (dedicated traffic channel) can be mapped to the RACH which is a transport channel. And, the RACH is mapped to a physical random access channel (PRACH).

Once a MAC (medium access control) layer of a UE indicates a PRACH transmission to a physical layer of the UE, the physical layer of the UE selects a single access slot and a single signature and then transmits a PRACH preamble in uplink. The preamble is transmitted for an access slot interval having a length of 1.33 ms. One of 16 kinds of signatures is selected and transmitted for a first predetermined length of the access slot. If the UE transmits the preamble, a base station transmits a response signal via a downlink physical channel which is a AICH (acquisition indicator channel). The AICH transmitted as a response for the preamble carries the signature selected by the preamble for a first predetermined length of an access slot corresponding to the access slot for transmitting the preamble. In this case, the base station transmits a positive response (ACK: acknowledgement) or a negative response (NACK: non-acknowledgement) to the UE using the signature carried by the AICH. If the UE receives ACK, it transmits an RRC connection request message to the network using an allocated radio resource. Thereafter, the network transmits a contention resolution message and an RRC connection setup message to the UE. If the UE receives NACK, it indicates a PRACH transmission to the physical layer of the UE again after an appropriate duration. Meanwhile, if the AICH corresponding to the preamble transmitted by the UE is not received, the UE transmits a new preamble by a power 1-step higher than that of the previous preamble after a predetermined access slot.

DISCLOSURE OF THE INVENTION

Technical Problem

Conventionally, in the case of counting the number of UEs which desire to receive the MBMS service, a corresponding UE always transmits the RRC connection request message in uplink using a random access procedure. However, all UEs need not establish the RRC connection with a network through the MBMS counting procedure, and thus unnecessary overhead and a waste of resources occur in the above procedure.

Accordingly, the present invention is directed to a method for controlling an uplink connection of an UE in idle mode that substantially obviates one or more problems due to limitations and disadvantages of the related art.

An object of the present invention is to provide a method for reducing overhead and resource waste associated with an UE in idle mode which desires to receive a broadcast/multicast service.

Another object of the present invention is to provide a method for adaptively controlling types or contents of uplink or downlink messages based on the need of connection between the UE and a network.

Another object of the present invention is to provide a method for selectively transmitting a network connection request message based on the need of connection between the UE and a network.

Technical Solution

In accordance with one aspect of the present invention, in a procedure for counting the number of UEs in idle mode which desire to receive a broadcast/multicast service, a network may transmit control information associated with a connection to the UEs in idle mode. For the convenience of description, control information associated with the connection is referred to as connection indication information, but it should be noted that the above control information may also be referred to as other terms.

Preferably, the UE may selectively transmit the network connection message in responding to the counting, according to the connection indication information.

Preferably, if the UE does not request a connection with the network in responding to the counting, the network does not transmit a message associated with the connection to the UE.

In one aspect of the present invention, there is provided a method for performing a random access procedure by a user equipment (UE) in an idle-mode which desires to receive a specific broadcast/multicast service in a wireless communication system, the method comprising the steps of: receiving a first message transmitted from a network, so as to count the number of UEs which desire to receive the broadcast/multicast service; transmitting a preamble for a random access to the network; receiving a second message including uplink (UL) radio resource allocation information from the network in response to the preamble; transmitting a third message selected according to a connection indication information contained in the first or second message to the network using the uplink (UL) radio resource allocation information, wherein the connection indication information indicates whether a connection to the network is required or not; and receiving a contention resolution message from the network.

In another aspect of the present invention, there is provided a method for counting the number of UEs in an idle-mode which desire to receive a specific broadcast/multicast service in a network of a wireless communication system, the method comprising the steps of: transmitting a first message so as to count the number of UEs which desire to receive the broadcast/multicast service; receiving a random access preamble from a specific UE; transmitting a second message including uplink (UL) radio resource allocation information in response to the random access preamble; receiving a third message selected according to a connection indication information contained in the first or second message and transmitted by the UE using the uplink (UL) radio resource allocation information, wherein the connection indication information indicates whether a connection to the network is required or not; and transmitting a contention resolution message to the UE.

Advantageous Effects

The present invention has the following effects.

First, the present invention can reduce unnecessary overhead and resource wastes associated with an UE in idle mode desiring to receive the broadcast/multicast service.

Second, the present invention can adaptively control types and contents of uplink and downlink messages according to the need of connection between the UE and the network.

Third, the present invention can selectively transmit a network connection request message according to the need of connection between the UE and the network.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Embodiments explained in the following description are examples that the technical features of the present invention are applied to E-UMTS (evolved universal mobile telecommunications system).

Figure 1:
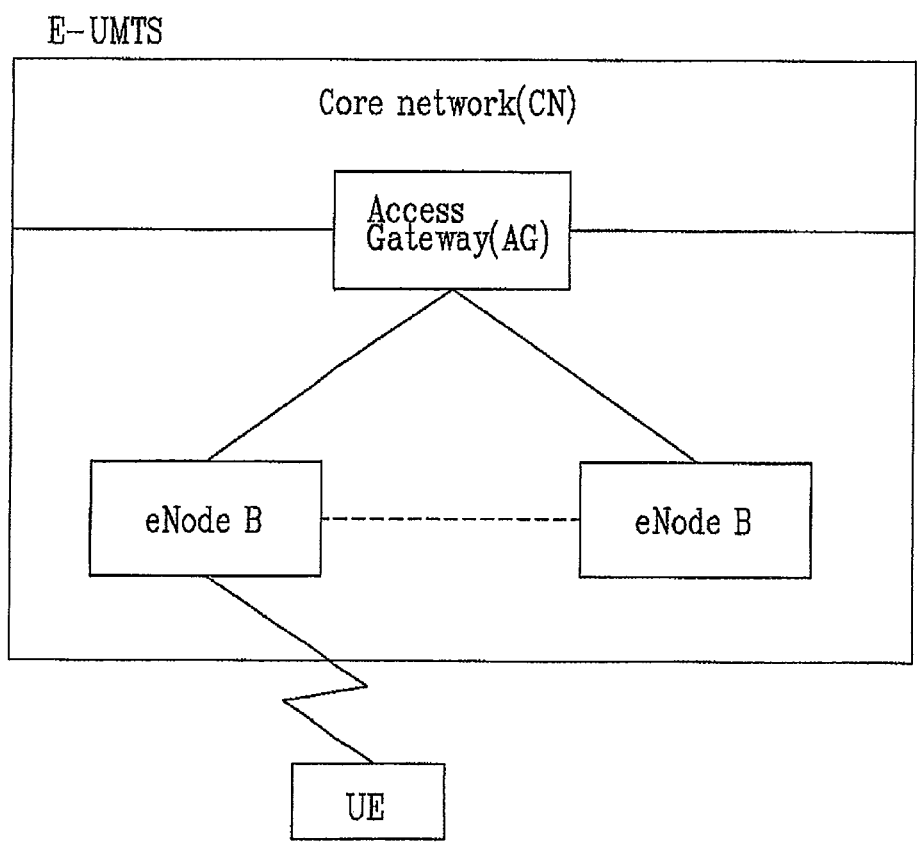
FIG. 1 is a structural diagram illustrating an E-UMTS network.

FIG. 1 a diagram of a network structure of E-UMTS. First of all, E-UMTS is the system evolving from the conventional WCDMA UMTS and its basic standardization is ongoing by 3GPP ($3^{rd}$ generation partnership project). And, the E-UMTS can be called LTE (long term evolution) system. For details of the technical specifications of UMTS and E-UMTS, Release 7 and Release 8 of '$3^{rd}$ generation partnership project: technical specification radio access network' can be referred to, respectively.

Referring to FIG. 1, E-UMTS mainly includes a user equipment (UE), a base station and an access gateway (AG) provided to an end point of a network (E-UTRAN) to be connected to an external network. Generally, the base station is able to simultaneously transmit multiplexed data streams for a broadcast service, a multicast service and/or unicast service. The AG can be divided into a part responsible for processing user traffic and a part responsible for processing control traffic. In this case, the AG for processing user traffic and the AG for processing control traffic can communicate with each other using a new interface in-between. At least one cell exists in a single eNB. Between eNBs, an interface for user traffic transmission or control traffic transmission can be used. A core network (CN) can include AG and a network node for user registration of UEs and the like. An interface for identifying the E-UTRAN and CN is available. The AG manages mobility of the UE by the unit of TA (tracking area). The TA includes a plurality of cells. If the UE moves away from a specific TA into another TA, it informs the AG that its located TA is changed.

Figure 2:
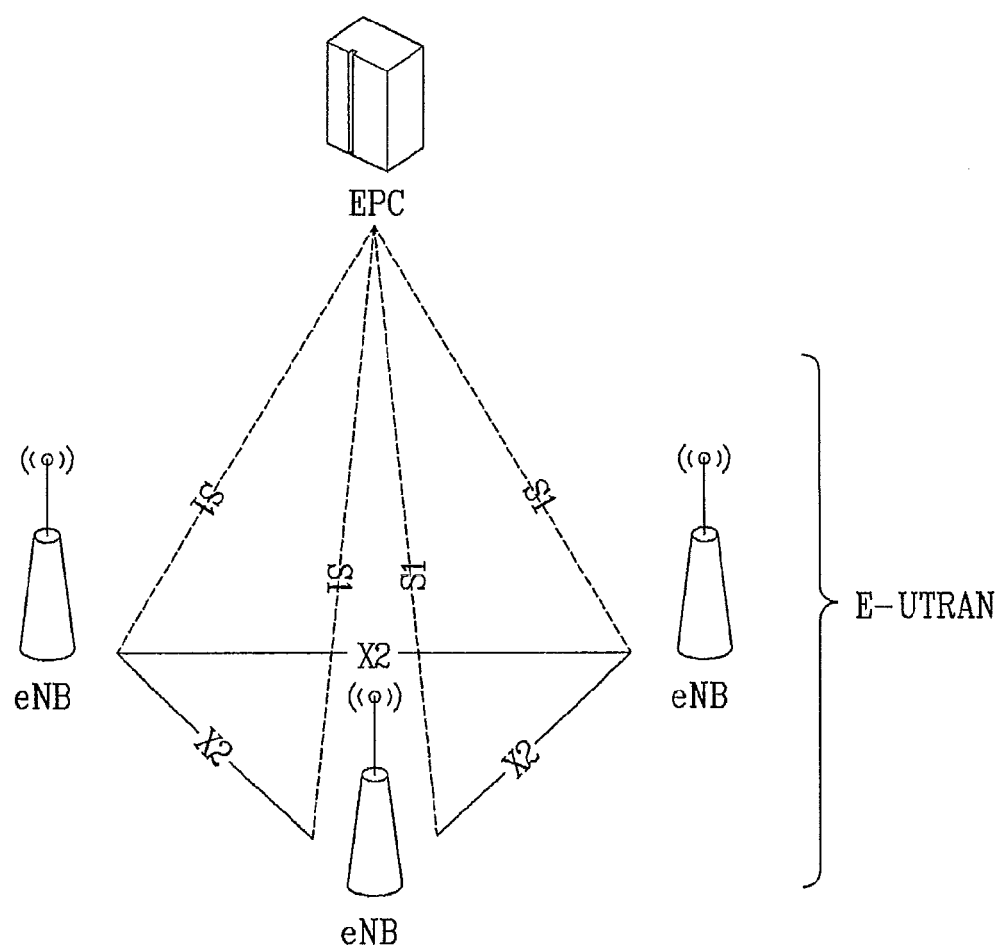
FIG. 2 is a structural diagram illustrating an E-UTRAN (Evolved-Universal Terrestrial Radio Access Network)

FIG. 2 is a schematic configurational diagram of E-UTRAN (evolved universal terrestrial radio access network).

The E-UTRAN system is the system evolving from the conventional UTRAN system. E-UTRAN includes base stations and eNBs are connected via X2 interface. The eNB is connected to a UE via a radio interface and is connected to an evolved packet core (EPC) via S1 interface.

Figure 3:
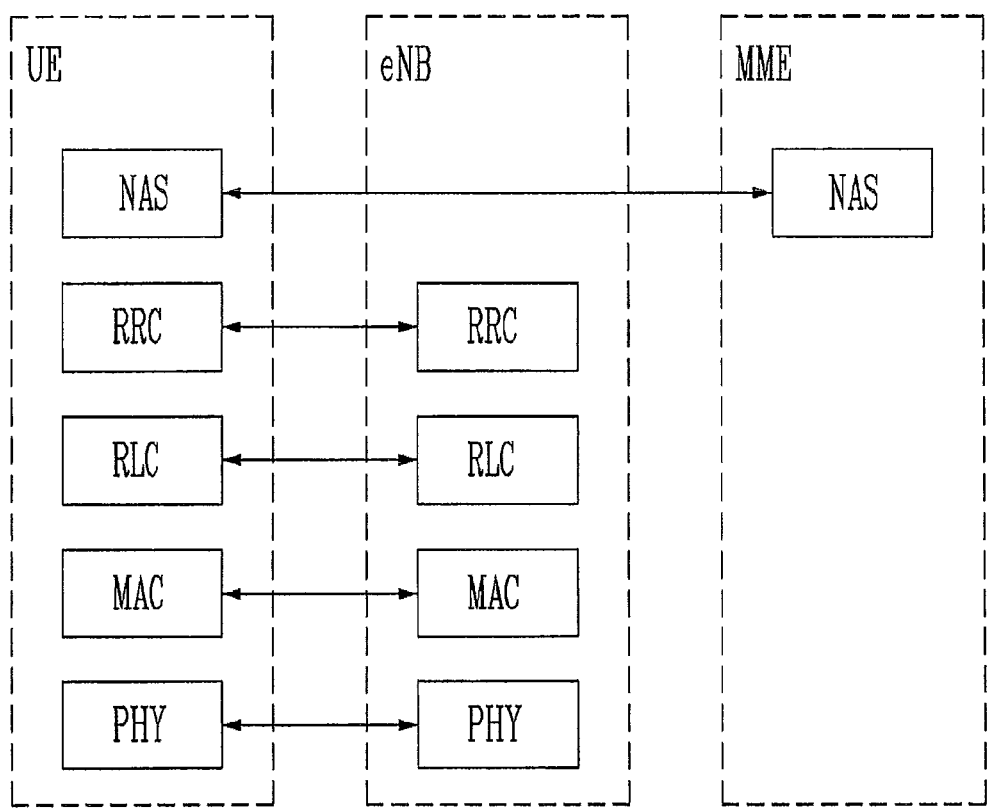
FIG. 3 is a structural diagram illustrating a radio interface protocol between a UE (User Equipment) and an E-UTRAN.

FIG. 3 is a diagram of a structure of a radio interface protocol between a UE (UE) and E-UTRAN. Referring to FIG. 3, a radio protocol layer horizontally includes a physical layer, a data link layer and a network layer. And, the radio protocol layer vertically includes a user plane for data information transfer and a control plane for control signal transfer (signaling). The radio protocol layers shown in FIG. 3 can be divided into L1 (first layer), L2 (second layer) and L3 (third layer) based on three lower layers of the open system interconnection (OSI) reference model widely known in the field of communication systems.

A physical layer of a first layer provides an upper layer with an information transfer service using a physical channel. The physical layer is connected to a medium access control layer on an upper layer via a transport channel. And, data is transferred between the medium access control layer and the physical layer via the transport channel. Moreover, data are transferred via the physical channel between different physical layers, i.e., between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated 'MAC') of a second layer provides a radio link control layer of an upper layer with a service via a logical channel. The radio link control (hereinafter abbreviated RLC) of the second layer supports a reliable data transmission. A PDCP layer of the second layer performs a header compression function for reducing unnecessary control information to efficiently transmit such an IP packet as IPv4 and IPv6 in a radio interface having a relatively narrow bandwidth.

A radio resource control (hereinafter abbreviated RRC) layer located at a lowest part of a third layer is defined in the control plane only and is responsible for controlling a logical channel, a transport channel and a physical channel in association with configuration, reconfiguration and release of radio bearers (hereinafter abbreviated RBs). In this case, each of the RBs means a service provided by the second layer for the data transfer between the UE and the E-UTRAN. For this, RRC layers exchange RRC messages between a UE and a network. If RRC connection is established between an RRC layer of a UE and an RRC layer of a network (RRC connected), the UE is in an RRC connected mode. If not, the UE is in an idle mode.

A non-access stratum (NAS) layer located above the RRC layer performs functions of session management, mobility management and the like.

A single cell belongs to an eNB is set to one of bandwidths including 1.25 MHz, 2.5 MHz, 5 MHz, 10 MHz, 20 MHz and the like to provide a downlink or uplink transmission service to a plurality of UEs. In this case, different cells can be set to different bandwidths, respectively.

A downlink transport channel for transmitting data to a UE from a network includes a broadcast channel (BCH) for transmitting system information, a paging channel (PCH) for transmitting a paging message or a downlink SCH (shared channel) for transmitting a user traffic or control message. Traffic of downlink multicast or broadcast service or a control message can be transmitted via the downlink SCH or a separate downlink MCH (multicast channel). Meanwhile, an uplink transport channel for transmitting data from a UE to a network includes a random access channel (RACH) for transmitting an initial control message and an uplink shared channel (SCH) for transmitting a user traffic or control message.

A logical channel located above a transport channel to be mapped to the transport channel includes a broadcast control channel (BCCH), a paging control channel (PCCH), a common control channel (CCCH), a multicast control channel (MCCH), a multicast traffic channel (MTCH) or the like.

Figure 4:
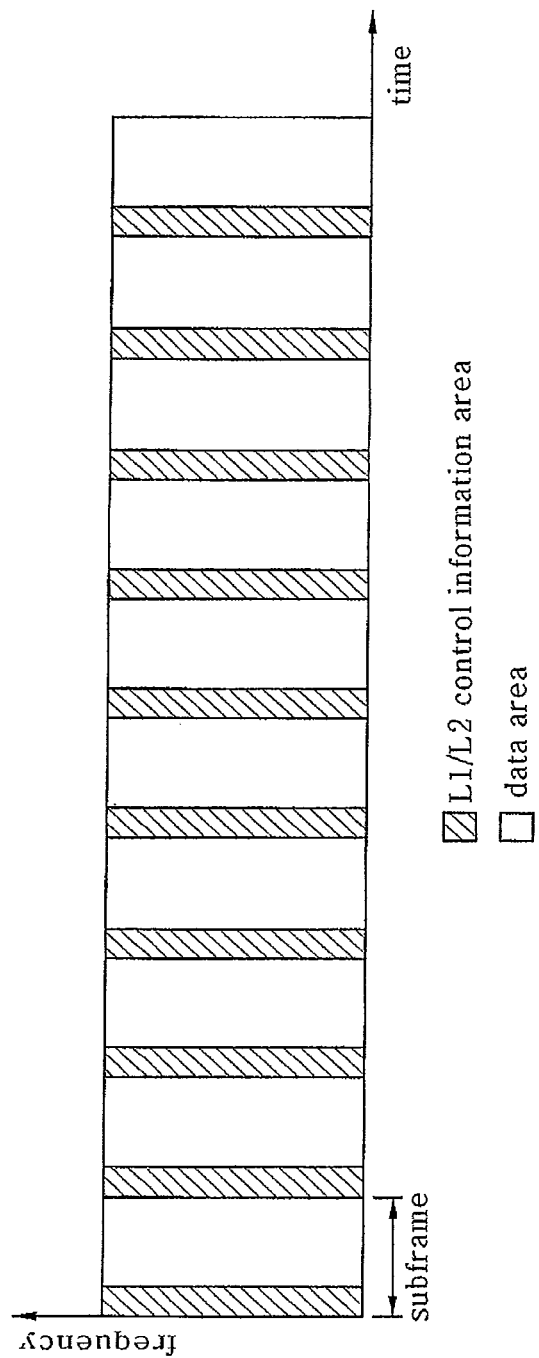
FIG. 4 is a structural diagram illustrating a physical channel structure used in E-UMTS.

FIG. 4 is a diagram for an example of a physical channel structure used for E-UMTS. A physical channel is constructed with a plurality of subframes on a time axis and a plurality of subcarriers on a frequency axis. In this case, a single subframe includes a plurality of symbols on the time axis. Each of the subframes includes a plurality of resource blocks. And, each of the resource blocks includes a plurality of symbols and a plurality of subcarriers. And, each of the subframes is able to use specific subcarriers of specific symbols (e.g., first symbol) of a corresponding subframe for a physical downlink control channel (PDCCH), i.e., L1/L2 control channel. An L1/L2 control information transmission area (hatched part) and a data transmission area (non-hatched part) are shown in FIG. 4. In the E-UMTS (evolved universal mobile telecommunication system) in progress of discussion, a radio frame of 10 ms is used. And, a single radio frame is constructed with ten subframes. And, each of the subframes includes two continuous slots. A length of a single slot is 0.5 ms. A single subframe is constructed with a plurality of OFDM symbols. And, some of a plurality of the OFDM symbols (e.g., first symbol) can be used to transmit L1/L2 control information.

Figure 5:
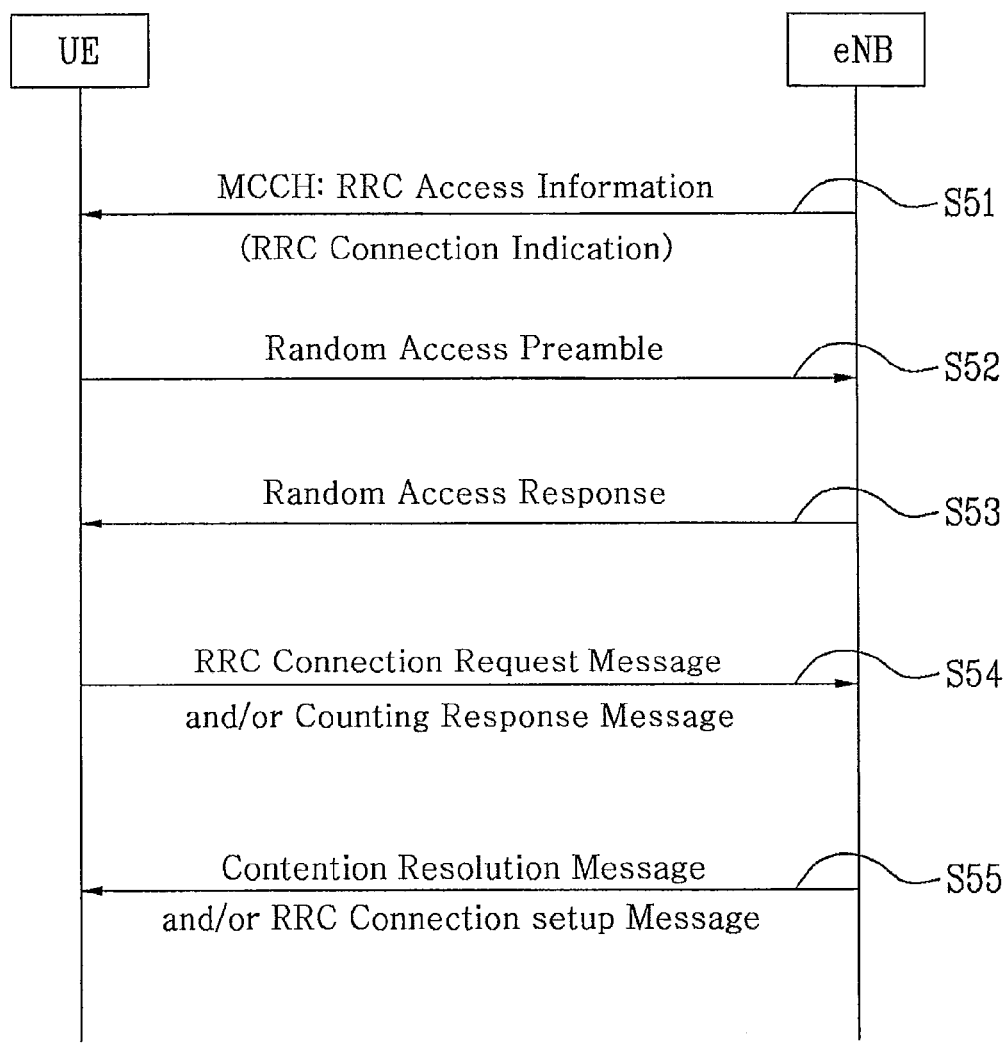
FIG. 5 is a flow chart illustrating a method for controlling an uplink connection of an UE in idle mode according to one embodiment of the present invention.

FIG. 5 is a flow chart illustrating a method for controlling an uplink connection of an idle UE according to one embodiment of the present invention.

Referring to FIG. 5, in order to provide a specific broadcast/multicast service, a base station transmits a first message for counting UEs attempting to receive the service to a UE [S51]. MBMS counting is then initiated by the first message. The first message can be an RRC message or a MAC control element, and preferably, an RRC connection information message. The first message can include at least one preamble (e.g., a specific preamble or a preamble set) allocated for the broadcast/multicast service. The first message can include a service identifier allocated by a CN or a RRC layer of the base station to identify the corresponding broadcast/multicast service. The service identifier can be a MTCH RNTI (radio network temporary identity) of MTCH or a MBMS RNTI. Moreover, the first message can further include a separate counting indicator for indicating an MBMS counting. The counting indicator can be a specific bit indicating '0' or '1'. Although the first message can be normally transmitted via a MCCH, it can be transmitted via a PDCCH as well. In case that the first message is transmitted via the PDCCH, the base station transmits the service identifier and the counting indicator together or separately.

In the embodiment of FIG. 5, a connection indication information indicating whether a connection between the UE and the base station is required is contained in the first message, and then the first message is transmitted to the UE. The above-mentioned connection indication information indicates the next operation of the UE in idle mode. According to the above-mentioned connection indication information, the UE may start a connection procedure to the base station (e.g., RRC connection procedure), or may stay in idle mode. The connection indication information may be indicated by the connection indicator. Preferably, the connection indication information may be contained in the first message, which was transmitted at the above step S51, or may be indicated to the UE via any other additional message. In this case, the connection indication information may be represented by a specific bit indicating '0' or '1'. The next operation of the UE is selectively controlled by the above connection indication information, such that an uplink access of the UE in idle mode associated with the MBMS counting can be controlled. It should be noted that the term 'connection indicator' is arbitrarily defined to illustrate the present invention and can also be replaced with other equivalent terms as necessary.

If the UE has no interest in the above specific MBMS service, the first message and the connection indication information is disregarded by the UE. However, if the UE desires to receive the specific MBMS service, the UE must be reflected in the MBMS counting. In other words, the UE must transmit a response message associated with the MBMS counting to the base station. If the aforementioned connection indication information indicates that a connection between the UE and the base station is required, the UE transmits a connection request message to the base station. Preferably, the UE transmits the RRC connection request message to the base station.

In this case, prior to transmitting messages associated with either the MBMS counting or a connection to the base station, the UE transmits a preamble to the base station according to a random access procedure [S52]. The preamble is allocated from the base station via the first message or may be set at the UE in advance. The allocated preamble is associated with the specific broadcast/multicast service. Hence, the base station is able to recognize that the UE joins the MBMS counting of the specific service using the preamble. On the contrary, in case that the preamble set at the UE in advance is used, a service identifier can be further included to indicate that the preamble is associated with the MBMS counting. Preferably, the preamble for the specific service is used. In case that the UE is provided with a UE dedicated preamble, the dedicated preamble is preferentially used rather than other preambles mentioned in the above description.

In case of receiving the random access preamble successfully, the base station transmits a second message to the UE in response to the preamble [S53]. The second message may include an identifier for the preamble, timing adjustment information, uplink radio resource allocation information, etc. The second message can selectively include a newly-allocated UE identifier (e.g., a temporary C-RNTI). A detailed description thereof will hereinafter be described in detail.

If the base station is unable to recognize the relationship between a received preamble and a specific service (e.g., if the above preamble is not one allocated for a specific service and has no information on a service identifier), the second message includes the newly-allocated UE identifier. Otherwise, if the base station is able to recognize that the received preamble is associated with the specific service, the second message optionally include the newly-allocated UE identifier according to configuration of the base station. A communication procedure where the new UE identifier is not allocated to the second message will be described later with reference to Step S54. However, a newly-allocated UE identifier, e.g. a temporary C-RNTI, may result in contention during a later communication procedure, and thus it is more preferable that the newly-allocated UE identifier may not be used on the condition that a connection between the UE and the base station is not required.

For example, the second message may be a random access response message. If the random access response message is not received by the UE within a certain period of time, or all the received random access responses do not include an identifier for the preamble transmitted by the UE, then the UE considers the random access procedure fails and may retransmit preamble for a certain number of times according to the step S52.

If the random access response includes an identifier for the preamble transmitted by the UE or a code sequence corresponding to the preamble, the UE transmits a third message to the base station using allocated uplink radio resources [S54]. The third message is adaptively selected according to the connection indication information received at the above step S51. According to a necessity of connecting the UE in idle mode to the base station, the UE may transmit a message associated with the MBMS counting only, or may transmit the connection request message along with the above message associated with the MBMS counting. In this way, the third message efficiently controls uplink access of UEs in idle mode along with the connection indication information.

For example, if the connection indication information indicates a connection with the base station, the third message may be a connection request message, more preferably, a RRC connection request message. In this case, the connection request message may have a counting response message function as well, or may be transmitted along with an additional counting response message. It is preferred for the connection request message to perform the counting response message function as well, which may be achieved by including a service identifier (e.g., MTCH RNTI, MBMS RNTI) in the connection request message. Also, if the connection indication information does not indicate the connection with the base station, the third message is just a counting response message. The counting response message can be transmitted via the RRC message or the MAC control element. The counting response message informs the base station that a corresponding UE desires to receive a specific MBMS service.

In other words, according to the connection indication information, the third message may be a counting response message, a connection request message having a counting response function, or both the counting response message and the connection request message. The connection request message and/or the counting response message may include at least one of a UE identifier and a service identifier. Preferably, the connection request message and/or the counting response message may include both the UE identifier and the service identifier. Also, the connection request message and/or the counting response message may include a counting response indicator.

If a UE identifier is newly allocated to the second message at step S53, the UE identifier contained in the third message is the newly-allocated UE identifier. If the UE identifier is not allocated to the second message, a pre-allocated UE identifier may be used in the third message. A Non-Access Stratum Identity, for example an International Mobile Subscriber Identity (IMSI), a Temporary Mobile Subscriber Identity (TMSI), a Packet-TMSI (P-TMSI) and the like, may be used as the pre-allocated UE identifier.

If the UE successfully transmits the third message selected according to the connection indication information, and then the base station transmits a contention resolution message [S55]. The contention resolution message may be transmitted via a DL-SCH or a PDCCH. The contention resolution message may include at least one of the UE identifier and the service identifier. Preferably, the contention resolution message may include both the UE identifier and the service identifier. The contention resolution message acts corresponding to the counting response message. If the UE identifier is a NAS UE identifier, the PDCCH indicating the above contention resolution message may be addressed using a MTCH RNTI, which is one of a service identifier. The NAS UE identity is contained in a contention resolution message and interpreted by a NAS of the UE. The contention resolution message may include a counting stop indicator for indicating the counting process to stop.

If the UE transmits the connection request message in uplink at a previous step, the base station may transmit the contention resolution message in downlink and the connection setup message (e.g., a RRC connection setup message or RRC connection reject message). The contention resolution message may be also contained in the connection setup message, and then be transmitted in downlink. For example, if the UE receives the RRC connection setup message, it transmits the RRC connection setup complete message to the base station and the mode of the UE is transit from a RRC idle mode to a RRC connected mode.

If the UE transmits only the counting response message in uplink without transmitting the RRC connection request message, the base station may transmit only the contention resolution message in downlink. If the UE receives only the contention resolution message without receiving the RRC connection setup message, the UE terminates the above counting process.

If the UE does not receive the contention resolution message, the RRC connection setup message or the RRC connection reject message for a certain period of time, the UE may return to the above step S52 and then retransmit a preamble in uplink direction without terminating the counting process.

Alternatively, if the connection indication information does not indicate the connection to the base station, in order to use radio resources efficiently, the base station can transmit the contention resolution message at least two times, preferably up to a maximum number of HARQ retransmission times. Also, the UE may not transmit ACK/NACK signals in response to the contention resolution message to the base station.

Figure 6:
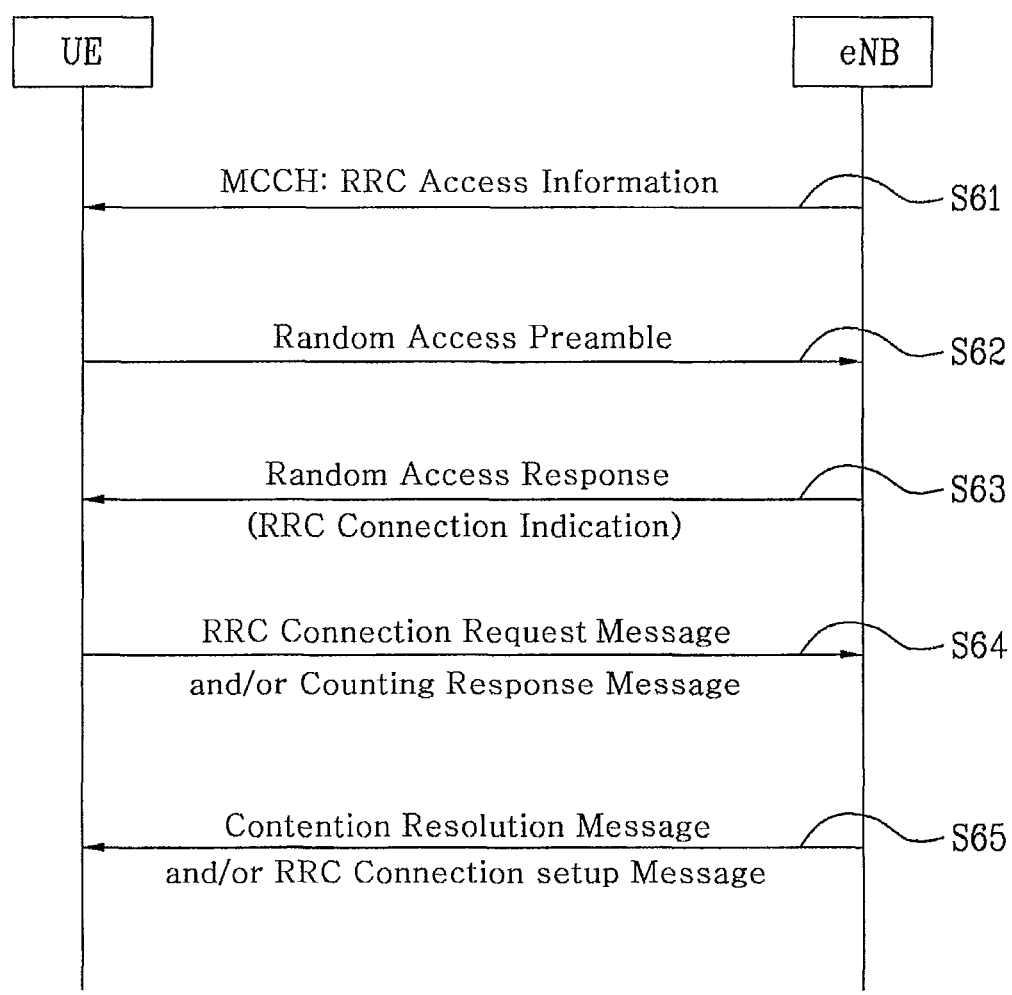
FIG. 6 is a flow chart illustrating a method for controlling an uplink connection of an UE in idle mode according to another embodiment of the present invention.

FIG. 6 is a flow chart illustrating a method for controlling an uplink connection of an UE in idle mode according to another embodiment of the present invention. The embodiment of FIG. 6 shows that the connection indication information is transmitted from the base station to the UE at a different time from that of FIG. 5. Therefore, steps S61~S65 of FIG. 6 basically correspond to steps S51~S55 of FIG. 5. For the convenience of description, the embodiment of FIG. 6 will hereinafter be described on the basis of differences between the embodiments of FIGS. 5 and 6.

Referring to FIG. 6, the base station transmits a first message for the MBMS counting to the UE [S61]. The connection indication information is not transmitted at step S61, which is different from the step S51.

The UE transmits a preamble to the base station at step S62, and its detailed description is equal to those of the step S52.

The base station transmits a second message as a random access response to the UE [S63]. The connection indication information, which was transmitted at the above step S51 of FIG. 5, is transmitted along with the second message in this example. The connection indication information may be contained in the second message or may also be transmitted using an additional message. At step S63, the connection indication information may be indicated by a connection indicator or the allocation/non-allocation of a UE identifier. If the connection indication information is indicated by a connection indicator, a newly-allocated UE identifier (e.g., a temporary C-RNTI) is contained in the second message. In the following communication procedure, the UE identifier will be used. Otherwise, if the connection indicator is indicated by the allocation/non-allocation of the UE identifier, a pre-allocated UE identifier (e.g., a NAS UE identity) is used for the UE in the following communication procedure. As previously stated above, the UE identifiers (such as a temporary C-RNTI) have the possibility of encountering a contention between themselves, and thus it is preferable to proceed a communication procedure using a pre-allocated UE identifier.

The UE transmits the third message selected according to the connection indication information to the base station [S64]. Detailed contents of the above step S64 are equal to those of Step S54.

The base station transmits a contention resolution message [S65]. Detailed contents of the above step S65 are equal to those of Step S55.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope and spirit of the present invention.

The embodiments of the present invention have been disclosed on the basis of a data communication relationship between the base station and the UE (UE). Specific operations to be conducted by the base station in the present invention may also be conducted by an upper node as necessary. In other words, it will be obvious to those skilled in the art that various operations for enabling the base station to communicate with the UE (UE) in a network composed of several network nodes including the base station will be conducted by the base station or other network nodes other than the base station. The term 'base station (BS)' may be replaced with a fixed station, a Node-B, an eNB, an eNode-B or an access point as necessary. The term 'user equipment (UE)' may be replaced with a terminal, a mobile station (MS) or a mobile subscriber station (MSS) as necessary.

The above-mentioned embodiments of the present invention can be implemented by hardware, firmware, software, or a combination of them. In the case of implementing the present invention by hardware, one embodiment of the present invention can be implemented with ASICs (application specific integrated circuit), DSPs (digital signal processors), DSPDs (digital signal processing devices), PLDs (programmable logic devices), FPGAs (field programmable gate arrays), a processor, a controller, a microcontroller, and a microprocessor.

If operations or functions of the present invention are implemented by firmware or software, the present invention can be implemented in the form of a variety of formats, for example, modules, procedures, and functions, etc. The software codes may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The above-mentioned embodiments and advantages have been disclosed for only illustrative purposes, the scope and spirit of the present invention are not limited to only the aforementioned embodiments, and can also be readily applied to other devices.

The above-mentioned detailed description of the present invention has been disclosed for only illustrative purposes of the present invention, without limiting the scope and spirit of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Various modifications, substitutions, and corrections of the present invention are obvious to those skilled in the art. In the following claims, means-plus-function clauses will be given to perform the above functions of this application, and cover not only the above-mentioned structure disclosed above but also other structural equivalents or constructions equivalent to them.

What is claimed is:

1. A method for performing a random access procedure by a user equipment (UE) in an idle-mode which desires to receive a specific broadcast/multicast service in a wireless communication system, the method comprising the steps of:
   receiving a first message from a network, the first message including a counting request for the broadcast/multicast service;
   in response to the first message, transmitting a preamble for a random access to the network;
   in response to the preamble, receiving a second message including uplink (UL) radio resource allocation information from the network, the second message further including timing adjustment information and a connection indicator;
   in response to the second message, transmitting a third message to the network using the uplink (UL) radio resource allocation information, the third message including a service identifier for the specific broadcast/multicast service; and
   in response to the third message, receiving a contention resolution message from the network,
   wherein, when the connection indicator indicates that a connection to the network is required, the third message includes both a response to the counting request and a Radio Resource Control (RRC) connection request message, and
   wherein, when the connection indicator indicates that a connection to the network is not required, the third message includes the response to the counting request without the Radio Resource Control (RRC) connection request message.

2. The method of claim 1, wherein the first message further includes at least one preamble allocated for the broadcast/multicast service.

3. The method of claim 2, wherein the preamble for the random access is selected from the allocated at least one preamble.

4. The method of claim 1, wherein the first message includes the service identifier for identifying the specific broadcast/multicast service.

5. The method of claim 1, wherein the first message further includes a counting indicator indicating that the first message is for counting the number of UEs which desire to receive the broadcast/multicast service.

6. The method of claim 1, wherein the third message further includes a UE identifier.

7. The method of claim 6, wherein the UE identifier is either a UE identifier allocated to the second message or a pre-allocated UE identifier.

8. The method of claim 1, wherein the contention resolution message includes at least one of a UE identifier and the service identifier.

9. The method of claim 1, wherein the contention resolution message includes a counting stop indicator for indicating a counting process to stop.

10. The method of claim 1, wherein, if the connection indicator indicates that the connection to the network is not required, transmission of an acknowledgement (ACK)/non-acknowledgement (NACK) signal for the contention resolution message is dropped.

11. A method for counting the number of UEs in an idle-mode which desire to receive a specific broadcast/multicast service in a network of a wireless communication system, the method comprising the steps of:
    transmitting a first message to a user equipment (UE), the first message including a counting request for the broadcast/multicast service
    in response to the first message, receiving a random access preamble from a specific UE;
    in response to the random access preamble, transmitting a second message including uplink (UL) radio resource allocation information, the second message further including timing adjustment information and a connection indicator;
    in response to the second message, receiving a third message from the UE using the uplink (UL) radio resource allocation information, the third message including a service identifier for the specific broadcast/multicast service; and
    in response to the third message, transmitting a contention resolution message to the UE,
    wherein, when the connection indicator indicates that a connection to the network is required, the third message includes both a response to the counting request and a Radio Resource Control(RRC) connection request message, and
    wherein, when the connection indicator indicates that a connection to the network is not required, the third message includes the response to the counting request without the Radio Resource Control (RRC) connection request message.

12. The method of claim 11, wherein the first message includes at least one preamble allocated for the broadcast/multicast service.

13. The method of claim 12, wherein the random access preamble is selected from the allocated at least one preamble.

14. The method of claim 11, wherein the first message further includes the service identifier for identifying the specific broadcast/multicast service.

15. The method of claim 11, wherein the first message further includes a counting indicator indicating that the first message is for counting the number of UEs which desire to receive the broadcast/multicast service.

16. The method of claim 11, wherein the third message further includes a UE identifier.

17. The method of claim 16, wherein the UE identifier is either a UE identifier allocated to the second message or a pre-allocated UE identifier.

18. The method of claim 11, wherein the contention resolution message includes at least one of a UE identifier and the service the service identifier.

19. The method of claim 11, wherein the contention resolution message includes a counting stop indicator for indicating a counting process to stop.

20. The method of claim 11, wherein, if the connection indicator indicates that the connection to the network is not required, the contention resolution message is transmitted at least two times.

\* \* \* \* \*